Patented Apr. 20, 1926.

1,581,825

UNITED STATES PATENT OFFICE.

FRED ANDERSON, OF VALLEJO, CALIFORNIA, ASSIGNOR TO FRANK H. GOULETTE, OF MANILA, PHILIPPINE ISLANDS.

GERMICIDAL COMPOSITION.

No Drawing. Application filed February 2, 1925. Serial No. 6,467.

*To all whom it may concern:*

Be it known that I, FRED ANDERSON, a citizen of the United States, residing at Vallejo, California, have invented certain new and useful Improvements in Germicidal Compositions, of which the following is a specification.

This invention relates to a germicidal composition for external use and of powdered form, and is designed primarily for the killing of vermin of the parasitic class, but it is understood that a germicidal composition, in accordance with this invention, can be employed for any purpose for which it is found applicable, and the invention has for its object to provide, in a manner as hereinafter set forth, a germicidal composition which is thoroughly efficient when applied for the killing of vermin and without injuring the surface to which it is applied, as well as having a soothing and counter-irritant effect on the surface to which the composition has been applied.

A germicidal composition, in accordance with this invention, is formed from a compound of creoline, water, alcohol solution of salicylic acid, alcohol solution of menthol, alcohol solution of camphor, sulphur and talc powder.

The preferred proportions of the several ingredients of the composition are as follows:—

| | |
|---|---|
| Creoline | 50 cc. |
| Water | 15 cc. |
| Salicylic acid alch. sol. 21% | 75 cc. |
| Menthol alch. sol. 20% | 50 cc. |
| Camphor alch. sol. 20% | 50 cc. |
| Sulphur subl | 100 gms. |
| Talc powder | 150 gms. |
| Talc powder | 1850 gms. |

The manner of compounding the composition is as follows:

A solution of creoline, water, salicylic acid, menthol, and camphor is first made, then the sulphur combined with 150 gms. of the talc powder is admixed with the solution and after the sulphur and talc powder has been combined with the solution, there is incorporated in the mixture 1850 gms. of talc powder.

A solution is first made of the creoline and water, in order to make the creoline more mixable with the talc powder, and to such solution is added the salicylic acid and the amount of water is such that can be safely used without precipitating the salicylic acid from the alcohol solution and such amount is 15 cc. The alcohol solution of menthol and camphor are readily mixable with the creoline and salicylic acid thus prepared and serve as soothing and counter-irritant agents.

As the sulphur will not combine with the solution above formed from the constituents set forth in the preceding paragraph, it has been found necessary to first mix it with a certain amount of talc and then incorporate it with such solution, and therefore such mixture consists of combining 100 gms. of sulphur with 150 gms. of talc powder.

After the sulphur and talc powder have been added to the solution, there is incorporated slowly in said mixture talc powder of an amount up to two (2) kilos by weight, or 1850 gms. The object of incorporating the talc powder slowly with the mixture is to get every microscopic crystal held in the above solution evenly distributed throughout the bulk. The amount of salicylic acid solution, as herein referred to, is 21% instead of 20% as about 1% is lost in the drying process.

After the ingredients have been combined, the bulk is dried, and the drying should be done with utmost care while the bulk is constantly stirred. Too much heat applied will be noticed by a yellow sulphurous precipitate, at the bottom of the container carrying the bulk, as such precipitate is the adhering sulphur disintegrating.

The composition is to be kept in closed containers.

It is thought that the many advantages of a germicidal composition, in accordance with this invention, can be readily understood, and although the preferred embodiment of the composition is as described, yet it is to be understood that changes in the details of the proportions can be had which will fall within the scope of the invention as claimed.

What I claim is:—

1. A germicidal composition of powdered form consisting of a powdered mass of talc, a water solution of creolin, an alcoholic solution of salicylic acid, an alcoholic solution of menthol and camphor, and a mixed body of talc and sulphur and with the talc of said body materially less in volume than the volume of the mass of talc.

2. A germicidal composition of powdered form consisting of 1850 grams of powdered talc, a solution formed of 50 cc. of creolin and 50 cc. of water, 75 cc. of a 21% alcoholic solution of salicylic acid, 50 cc. of a 20% alcoholic solution of menthol, 55 cc. of an alcoholic solution of camphor, and a mixed body of 150 grams of talc and 100 grams of sulphur.

3. A method of manufacturing a germicidal composition of powdered form consisting in combining a water solution of creolin with an alcoholic solution of salicylic acid, menthol and camphor to provide a liquid body, then combining with the said liquid body a mixture of talc and sulphur, then incorporating slowly a mass of talc of a materially greater volume than the volume of talc of said mixture into said liquid body to form a mass, and then drying said mass while constantly stirring the same.

In testimony whereof, I affix my signature hereto.

FRED ANDERSON.